(12) United States Patent
Kueckendahl et al.

(10) Patent No.: US 9,377,329 B2
(45) Date of Patent: Jun. 28, 2016

(54) SENSOR APPARATUS

(75) Inventors: Peter Joerg Kueckendahl, Bad Oldesloe (DE); Daniel Joseph Ryan, Sycamore, IL (US)

(73) Assignee: ALLTEC Angewandte Laserlicht Technologie GmbH, Selmsdorf (DE)

( * ) Notice: Subject to any disclaimer, the term of this patent is extended or adjusted under 35 U.S.C. 154(b) by 367 days.

(21) Appl. No.: 13/976,820

(22) PCT Filed: Dec. 22, 2011

(86) PCT No.: PCT/EP2011/006515
§ 371 (c)(1),
(2), (4) Date: Jun. 27, 2013

(87) PCT Pub. No.: WO2012/089320
PCT Pub. Date: Jul. 5, 2012

(65) Prior Publication Data
US 2013/0305848 A1    Nov. 21, 2013

(30) Foreign Application Priority Data
Dec. 30, 2010    (EP) .................................... 10016196

(51) Int. Cl.
| G01N 11/00 | (2006.01) |
| G01D 11/00 | (2006.01) |
| H04N 1/193 | (2006.01) |
| H04N 1/195 | (2006.01) |

(52) U.S. Cl.
CPC ............... *G01D 11/00* (2013.01); *H04N 1/193* (2013.01); *H04N 1/1932* (2013.01); *H04N 1/19505* (2013.01); *H04N 1/19573* (2013.01)

(58) Field of Classification Search
None
See application file for complete search history.

(56) References Cited

U.S. PATENT DOCUMENTS

| 4,707,063 A | 11/1987 | Plummer |
| 4,884,974 A * | 12/1989 | DeSmet .................... 434/317 |
| 5,152,962 A * | 10/1992 | Lackie ..................... 422/68.1 |

(Continued)

FOREIGN PATENT DOCUMENTS

| DE | 2401322 | 1/1974 |
| DE | 3826113 A1 | 2/1989 |

(Continued)

OTHER PUBLICATIONS

Notice of Allowance and Fee(s) due for U.S. Appl. No. 13/976,809, dated Jul. 7, 2015, 17 pages.

(Continued)

*Primary Examiner* — Robert R Raevis
(74) *Attorney, Agent, or Firm* — Hoffman Warnick LLC

(57) ABSTRACT

The invention relates to a sensor apparatus for detecting an object comprising a sensor head having a plurality of receiving spaces for individual sensor devices and a driving mechanism for providing a relative movement of the object relative to the sensor head in an advance direction during a detecting operation. The receiving spaces are arranged in a plurality of rows and columns, such that an array of receiving spaces with a rectangular pattern of the receiving spaces is formed, and the array of receiving spaces is tilted with regard to the advance direction such that the rows extend in a transverse direction relative to the advance direction and the receiving spaces of a successive row of the rectangular pattern are offset with regard to the receiving spaces of a preceding row of the rectangular pattern in a direction perpendicular to the advance direction.

15 Claims, 15 Drawing Sheets

(56) References Cited

U.S. PATENT DOCUMENTS

| | | | |
|---|---|---|---|
| 5,399,032 | A | 3/1995 | Itoh et al. |
| 5,477,259 | A | 12/1995 | Iwasa |
| 5,777,634 | A | 7/1998 | Okamura et al. |
| 5,784,098 | A | 7/1998 | Shoji et al. |
| 5,797,845 | A * | 8/1998 | Barabash et al. ............ 600/443 |
| 6,189,991 | B1 | 2/2001 | Wen et al. |
| 6,286,927 | B1 | 9/2001 | Taneya et al. |
| 6,381,377 | B1 * | 4/2002 | Wang ............................ 382/299 |
| 6,469,729 | B1 | 10/2002 | Ryan |
| 6,738,086 | B2 | 5/2004 | Oka |
| 6,855,921 | B1 | 2/2005 | Stopperan et al. |
| 7,354,130 | B2 | 4/2008 | Arakawa |
| 7,443,508 | B1 * | 10/2008 | Vrhel et al. ................... 356/446 |
| 7,448,719 | B1 | 11/2008 | Newell |
| 7,564,020 | B2 | 7/2009 | Sergyeyenko |
| 7,671,337 | B1 | 3/2010 | Tidwell |
| 7,908,968 | B2 | 3/2011 | McCoin et al. |
| 2002/0001004 | A1 | 1/2002 | Mantell et al. |
| 2002/0101469 | A1 | 8/2002 | Wade et al. |
| 2002/0109741 | A1 | 8/2002 | Okabe et al. |
| 2002/0139273 | A1 | 10/2002 | Murata et al. |
| 2002/0140801 | A1 * | 10/2002 | Kubota ......................... 347/239 |
| 2002/0191069 | A1 | 12/2002 | Oka |
| 2003/0016348 | A1 | 1/2003 | Sallee |
| 2003/0210861 | A1 | 11/2003 | Weiss et al. |
| 2003/0235373 | A1 | 12/2003 | Ishii et al. |
| 2004/0160478 | A1 | 8/2004 | Weijkamp et al. |
| 2005/0122548 | A1 * | 6/2005 | Cunnigan et al. ............. 358/494 |
| 2005/0123303 | A1 | 6/2005 | Guttman et al. |
| 2005/0140770 | A1 | 6/2005 | Kang et al. |
| 2005/0226466 | A1 * | 10/2005 | Seymour ....................... 382/112 |
| 2005/0286093 | A1 | 12/2005 | Sumi et al. |
| 2006/0006486 | A1 * | 1/2006 | Seo et al. ...................... 257/433 |
| 2006/0066924 | A1 | 3/2006 | Delueg |
| 2006/0109525 | A1 | 5/2006 | Evans |
| 2007/0091132 | A1 | 4/2007 | Lim |
| 2007/0279713 | A1 | 12/2007 | Feng et al. |
| 2008/0055352 | A1 | 3/2008 | Toh et al. |
| 2008/0246962 | A1 | 10/2008 | Yang |
| 2009/0032714 | A1 * | 2/2009 | Peter et al. ................ 250/363.01 |
| 2009/0220199 | A1 * | 9/2009 | Yazaki et al. ................... 385/78 |
| 2010/0002057 | A1 | 1/2010 | Hatasa et al. |
| 2010/0102032 | A1 | 4/2010 | Bathelet |
| 2010/0214387 | A1 | 8/2010 | Fox et al. |
| 2010/0231929 | A1 * | 9/2010 | Kakigi ........................... 358/1.2 |
| 2013/0021398 | A1 | 1/2013 | Mizes et al. |
| 2013/0286147 | A1 | 10/2013 | Kueckendahl et al. |
| 2013/0286148 | A1 | 10/2013 | Kueckendahl et al. |
| 2013/0286149 | A1 | 10/2013 | Kueckendahl et al. |
| 2013/0293658 | A1 | 11/2013 | Kueckendahl et al. |
| 2013/0328978 | A1 | 12/2013 | Sekino et al. |
| 2013/0342823 | A1 | 12/2013 | Kueckendahl et al. |

FOREIGN PATENT DOCUMENTS

| | | |
|---|---|---|
| EP | 0121369 A2 | 10/1984 |
| EP | 0832754 B1 | 12/1993 |
| EP | 0832752 A2 | 4/1998 |
| EP | 1266763 A1 | 12/2002 |
| EP | 1640169 A3 | 9/2005 |
| EP | 1640169 A2 | 3/2006 |
| EP | 1640169 A3 | 10/2007 |
| EP | 2105309 A1 | 9/2009 |
| JP | 59136267 | 8/1984 |
| JP | 05185686 | 7/1993 |
| JP | 2001332806 A | 11/2001 |
| JP | 2007090814 A | 4/2007 |
| JP | 2008126471 A | 6/2008 |
| JP | 2009037128 A | 2/2009 |
| WO | 8505187 A1 | 11/1985 |
| WO | 2006037973 A1 | 4/2006 |
| WO | 2007107030 A1 | 9/2007 |
| WO | 2008104222 A1 | 9/2008 |
| WO | 2009153795 A1 | 12/2009 |

OTHER PUBLICATIONS

Notice of Allowance and Fee(s) due for U.S. Appl. No. 13/977,151, dated Jul. 29, 2015, 18 pages.
U.S. Appl. No. 13/976,804, Notice of Allowance, Feb. 3, 2015, 11 pages.
U.S. Appl. No. 13/976,793, Notice of Allowance, Feb. 4, 2015, 16 pages.
U.S. Appl. No. 13/976,779, Notice of Allowance, Feb. 6, 2015, 18 pages.
U.S. Appl. No. 13/976,809, Office Action, Feb. 6, 2015, 78 pages.
U.S. Appl. No. 13/977,151, Office Action, Feb. 17, 2015, 70 pages.
U.S. Appl. No. 13/977,159, Notice of Allowance, Feb. 17, 2015, 15 pages.
U.S. Appl. No. 13/977,156, Notice of Allowance dated Mar. 16, 2015, 21 pgs.
International Application No. PCT/EP2011/006515, International Preliminary Report on Patentability, Jan. 21, 2013.
International Application No. PCT/EP2011/006515, Written Opinion on Search Report.
International Application No. PCT/EP2011/006518, Written Opinion of International Search Authority.
International Application No. PCT/EP2011/006519, Written Opinion of International Search Authority.
International Application No. PCT/EP2011/006519, Preliminary Report on Patentability.
International Application No. PCT/EP2011/006517, Written Opinion of International Search Authority.
U.S. Appl. No. 13/976,832, Notice of Allowance dated Oct. 8, 2014, 61 pages.
U.S. Appl. No. 13/976,814, Notice of Allowance dated Oct. 21, 2014, 72 pages.
U.S. Appl. No. 13/976,804, Final Office Action dated Oct. 24, 2014, pp. 18.
U.S. Appl. No. 13/977,159, Final Office Action dated Oct. 10, 2014, 53 pages.
U.S. Appl. No. 13/977,156, Final Office Action dated Dec. 5, 2014, 13 pages.
U.S. Appl. No. 13/976,793, Notice of Allowance dated Dec. 9, 2014, 66 pages.
U.S. Appl. No. 13/976,779, Notice of Allowance dated Oct. 21, 2014, 34 pages.
U.S. Appl. No. 13/976,779, Office Action dated Jun. 16, 2014.
U.S. Appl. No. 13/976,804, Notice of Allowance dated Mar. 20, 2014.
U.S. Appl. No. 13/976,809, Office Action dated May 27, 2014.
U.S. Appl. No. 13/977,159, Office Action dated Jun. 20, 2014.
U.S. Appl. No. 13/976,832, Notice of Allowance and Fees Due dated Jun. 24, 2014.
International Application No. PCT/EP2011/006516, Written Opinion of International Search Authority.
U.S. Appl. No. 13/976,814, Notice of Allowance Dated Dec. 29, 2014, 10 pages.
International Application No. PCT/EP2011/006520, Written Opinion of International Search Authority.
International Application No. PCT/EP2011/006514, Written Opinion of International Search Authority.
International Application No. PCT/EP2011/006522, Written Opinion of International Search Authority.
International Application No. PCT/EP2011/006522, International Report on Patentability.
International Application No. PCT/EP2011/00652023, Written Opinion of International Search Authority.
International Application No. PCT/EP2011/006521, Written Opinion of International Search Authority.
International Application No. PCT/EP2011/006521, Written Opinion of International Examining Authority.
U.S. Appl. No. 13/976,804, Office Action dated Jul. 8, 2014.
U.S. Appl. No. 13/976,793, Office Action dated Jul. 1, 2014.
U.S. Appl. No. 13/977,151, Notice of Allowance and Fees Due dated Aug. 4, 2014.
U.S. Appl. No. 13/977,156, Office Action dated Jul. 9, 2014.
U.S. Appl. No. 13/976,804, Notice of Allowance dated Apr. 30, 2015, 55 pgs.
International Application No. PCT/EP2011/006516, International Search Report, dated Mar. 23, 2012, 3 pages.

* cited by examiner

SENSOR APPARATUS

FIELD OF THE INVENTION

The present invention relates to a sensor apparatus for detecting an object.

Such a sensor apparatus comprises a sensor head having a plurality of receiving spaces for individual sensor devices and a driving mechanism for providing a relative movement of the object relative to the sensor head in an advance direction during a detecting operation.

The invention also relates to a method for detecting an object.

In this method the object is detected by a plurality of individual sensor devices and the object is moved relative to the sensor devices in an advance direction during a detecting operation.

RELATED ART

In a known sensor apparatus the sensor devices are arranged in a linear array or row, which extends transversely to the advance direction of the product. As the sensor devices, for example photodiodes, have certain dimensions, the resolution that can be achieved with such a sensor apparatus is limited.

SUMMARY OF THE INVENTION

It is an object of the invention to provide a sensor apparatus and a method for detecting an object having a good resolution.

The object is solved according to the invention with a sensor apparatus and a method as described herein.

The sensor apparatus is characterized in that the receiving spaces are arranged in a plurality of rows and columns, such that an array of receiving spaces with a rectangular pattern of the receiving spaces is formed, and the array of receiving spaces is tilted with regard to the advance direction such that the rows extend in a transverse direction relative to the advance direction and the receiving spaces of a successive row of the rectangular pattern are offset with regard to the receiving spaces of a preceding row of the rectangular pattern in a direction perpendicular to the advance direction.

One basic idea of the invention is to provide a sensor head with a plurality of rows of receiving spaces for individual sensor devices in order to enhance the speed of a detecting operation as compared to a sensing head having only a single row of sensor devices. The rows, in which the receiving spaces are arranged, extend in a transverse direction, that is, they extend transversely to the advance direction.

A further basic idea of the invention is to operate all sensor devices simultaneously, while the object is moved relative to the sensor head. In case that an image is detected or scanned, the original image is produced successively with an ongoing product movement.

According to the invention, at least a part of the receiving spaces of the sensor head is arranged in a regular pattern of rows and columns, wherein the columns are perpendicular to the rows. Such a pattern is referred to as a rectangular pattern of receiving spaces. In the rectangular pattern, the receiving spaces are arranged in a manner, that in each case four receiving spaces are arranged in the edges of a rectangle. The rectangular pattern may also be referred to as an orthogonal arrangement of receiving spaces. The receiving spaces are in particular arranged in a two-dimensional array or in a matrix.

It is preferred that the receiving spaces are arranged in a regular pattern, in which the pitch of the receiving spaces, that is the distance between two central points of neighbouring receiving spaces in one row or column, is constant. More particularly, it is preferred that a row pitch and column pitch are equal. The pitch of receiving spaces of the sensor head is also called the device pitch.

A basic aspect of the invention is to arrange the rows of receiving spaces for the sensor devices such that they extend transversely, but not perpendicularly, to the advance direction. Consequently, the columns of receiving spaces also extend transversely to the advance direction. The array of receiving spaces is thus rotated or tilted from a position, in which the columns are aligned with the advance direction, to a position, in which to columns are inclined or slanted with regard to the advance direction. As the receiving spaces are arranged in a rectangular array, the rows are also inclined or slanted with regard to a direction perpendicular to the advance direction.

It is preferred that the sensor head is a page-wide sensor head, that is, the sensor head has a width corresponding to the width of an object or image to be detected or scanned. The width of the object or image is defined as the dimension of the object or image of the transverse direction, in particular the direction perpendicular to the advance direction. The object or image may therefore be detected by moving the sensor head in the advance direction without overlaying a further movement of the sensor head in the transverse direction. The advance direction, which may also be called the product movement direction, is in particular a linear direction.

In a preferred embodiment of the sensor head, the receiving spaces are arranged in a regular field having a fundamentally rectangular shape. By tilting the rectangular field of receiving spaces relative to the advance direction, the detecting or scanning resolution may be enhanced, while at the same time an easy manufacturing of the sensor head is maintained. Each of the receiving spaces may be equipped with at least one, in particular exactly one, sensor device for detecting an object or an image on the object. The sensor devices may in particular be optical sensor devices such as for example a photodiode. Each of the sensor devices may detect or scan a single pixel or a line of pixels arranged in the product movement direction, when the object is moved relative to the sensor head.

In a preferred embodiment of the sensor apparatus a tilting angle, which is defined as the angle between the columns and the advance direction, is smaller than 45 degrees. It is preferred, that a tilting angle is in the range of 1 to 10 degrees, more preferably 2 to 8 degrees, even more preferably 2 to 5 degrees. In conjunction with an array of 32 times 32 receiving spaces the tilting angle is preferably about 2.7 degrees. The tilting of the array of receiving spaces may be achieved by tilting the sensor head relative to the advance direction and/or by tilting the array relative to the sensor head.

In a preferred embodiment of the invention, the receiving spaces are arranged in a regular rectangular pattern and the amount of offset of the receiving spaces of a successive row with regard to the receiving spaces of a preceding row is smaller than a pitch of receiving spaces of one row. The amount of offset is in particular the distance in a direction perpendicular to the advance direction between two corresponding receiving spaces of neighbouring or adjoining rows. The amount of offset corresponds to a scan line pitch.

In other words, a scan line pitch, that is a pitch of the scan lines or pixels in a direction perpendicular to the advance direction, is preferably smaller than the device pitch of one row, that is the pitch of the receiving spaces/sensor devices of one row. The columns of the array of receiving spaces are inclined such that the successive sensor device of one column scans a pixel that is offset with regard to the advance direction compared to a pixel scanned by a preceding sensor device of the same column.

In the regular rectangular pattern the pitch of receiving spaces of one row is preferably constant. In a preferred embodiment, which results in the maximum possible resolution, the amount of offset is defined as the reciprocal value of the number of rows.

In another preferred embodiment the rectangular pattern of rows and columns is tilted to a degree, in which at least a part of the receiving spaces of at least one row of the rectangular pattern is aligned with at least apart of the receiving spaces of at least one preceding row in the advance direction.

With this embodiment, a multiple scan of one the same pixel to be scanned is possible. That is, one and the same pixel may be scanned or detected by multiple sensor devices. The receiving spaces aligned in the advance direction preferably constitute receiving spaces of directly adjacent columns.

With the possibility of reading the same pixel with multiple sensors, it is for example possible to read different colours. For instance, three sensor devices for three different colours may be arranged in the array of receiving spaces such that they are aligned in the product movement direction.

The scanning resolution may be adjusted in that the sensor head is rotatable about an axis perpendicular to the advance direction such that the amount of offset of the receiving spaces is adjustable. In particular, the sensor head is rotatable about an axis being perpendicular to a surface of the object to be scanned. Alternatively or additionally, it is also possible to rotate the array of receiving spaces/sensor devices within the sensor head.

For a movement of the sensor head it is preferred that a motor, in particular a stepper motor, is provided for rotating the sensor head, in particular at defined small angle steps in the range of 0 to 90 degrees. The motor may in particular be an electrical motor.

Generally, receiving spaces of the sensor head may be equipped with individual sensor devices. For a flexible adjustment of the sensor head to a specific scanning or a detecting operation, it may be preferable that—besides the possibility of entirely filling the receiving spaces with sensor devices— the receiving spaces are configured to be partially equipped with sensor devices. In this regard, the sensor head is operable with an only partially filled array of receiving spaces.

In a preferred embodiment at least a part of the receiving spaces is equipped with sensor devices, wherein the sensor devices comprise at least an optical sensor element, a capacity sensor element, an inductive sensor element and/or a chemical sensor element. The sensor devices may for example be optical sensors, temperature sensors or infrared sensors. With a temperature or infrared sensor, a surface temperature profile of the object to be scanned can be detected. The sensor devices may be configured to detect a colour profile or a coating thickness profile of the object.

The sensor devices may for example comprise a PIN diode, a photodiode or a phototransistor. It is also possible to use pyroelectric sensor devices or micro antennae as sensor devices.

In another preferred embodiment of the invention at least a part of the receiving spaces is equipped with optical sensor devices, wherein the optical sensor devices comprise a fibre, which is arranged in a ferrule.

It is therefore a preferred embodiment of the invention that the sensor head comprises a plurality of ferrules arranged in a two-dimensional array. The fibres arranged in the ferrules may be coupled to a sensor element for detecting a light signal received from the object.

A reliable light signal may be achieved in that a lighting element, in particular a light emitting diode (LED), is arranged within the ferrule. The lighting element may be used for illuminating the object. The light of the lighting element is reflected or scattered by the object and is detectable by a sensor element arranged at an end of the fibre.

In another preferred embodiment a sensor element, in particular a sensor diode such as a photodiode, is arranged within the ferrule. In this case, the fibre of the ferrule may be coupled to a lighting element, for example a light emitting diode, for illuminating the object. The light is reflected or scattered by the object and detected by the sensor element arranged in the ferrule.

In particular in the case that the ferrule comprises a sensor element and/or a lighting element, it is preferred that the ferrule is at least partly transparent.

In a preferred embodiment of the sensor head, the sensor head comprises a receiving plate with a plurality of receiving holes as receiving spaces. The sensor devices, for example individual ferrules with fibre ends or individual photodiodes, may be placed and fixed in the receiving spaces. It is particularly preferred that the receiving holes are through-holes, into which the sensor devices may be inserted.

In a preferred embodiment, at least a part of the receiving holes has a circular cross-section. The circular cross-section allows for a good and tight connection of individual fibre ferrules. In this regard, it is preferred that the ferrules have a circular outer shape corresponding to the circular cross-section of the receiving holes.

The ferrules may fit into the holes in medium or transition fit, such that it is possible that the ferrules may be placed in the receiving holes and removed thereof by using a simple hand tool. It is particularly preferred that no additional fixtures are needed to bond the ferrules into the holes.

For holding the ferrules tight and removable in the receiving holes, it is preferred that a capture pad is arranged at at least one surface of the receiving plate. It is preferred that the capture pad includes an elastic polymer, in particular a rubber and/or an elastomer. The capture pad is preferably made of Viton® (a trademark belonging to E.I. Dupont de Nemours & Co. of Delaware) or includes the material Viton®. The ferrules may be pushed through the capture pad and are then held in place by the capture pad as it closes the ferrule after insertion. The ferrules can be removed by pushing back through from one side of the receiving plate.

In a further preferred embodiment a lens array comprising a plurality of lenses is provided, wherein the lenses are arranged in a rectangular pattern of rows and columns corresponding to the rectangular pattern of rows and columns of the receiving spaces. The lens array may be formed as a single unit or as individual lens inserts to be coupled to the receiving spaces of the sensor head.

It is also possible to arrange a single lens instead or in addition to the lens array. In another preferred embodiment, individual lenses may be inserted into the receiving holes of the receiving plate.

An inventive method is characterized in that the sensor devices are arranged in a plurality of rows and columns, such that an array of sensor devices with a rectangular pattern of the sensor devices is formed, and the object is detected or scanned while the array of sensor devices is tilted with regard to the advance direction such that the rows extend in a transverse direction relative to the advance direction and the sensor devices of a successive row of the rectangular pattern are offset with regard to the sensor devices of a preceding row of the rectangular pattern in a direction perpendicular to the advance direction.

With an inventive method, the advantages discussed in connection with the sensor apparatus may be achieved. In particular, it is possible to achieve a high resolution in a detecting or scanning operation.

BRIEF DESCRIPTION OF THE DRAWINGS

The invention will be further described with reference to the attached figures, wherein.

DETAILED DESCRIPTION OF THE INVENTION

Figure 1:
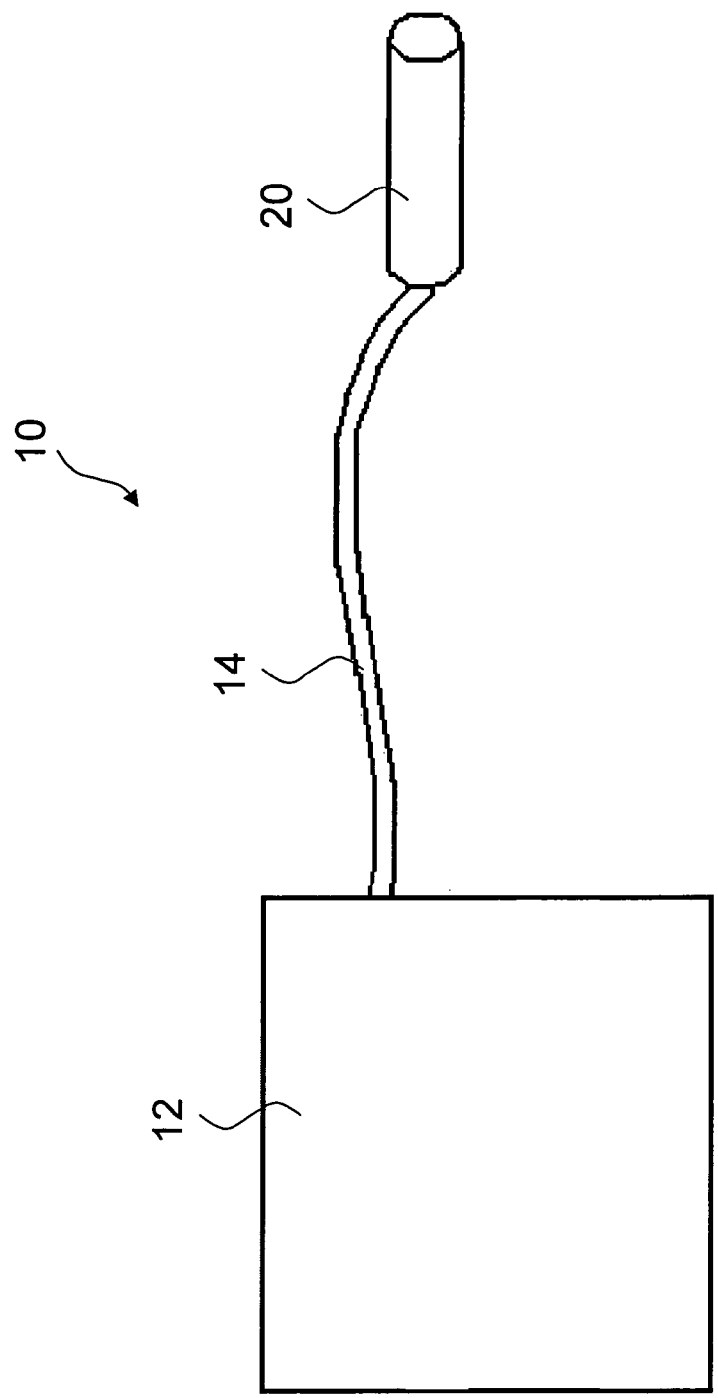
FIG. 1 shows an inventive sensor apparatus.

The principle structure of an inventive sensor apparatus 10 is shown in FIG. 1. The sensor apparatus 10 comprises a sensor device control and driving unit 12 and a sensor head 20 that is connected to the sensor device control and driving unit 12 through an umbilical 14. The sensor apparatus 10 may in particular be a pixel or matrix sensor apparatus.

Figure 2:
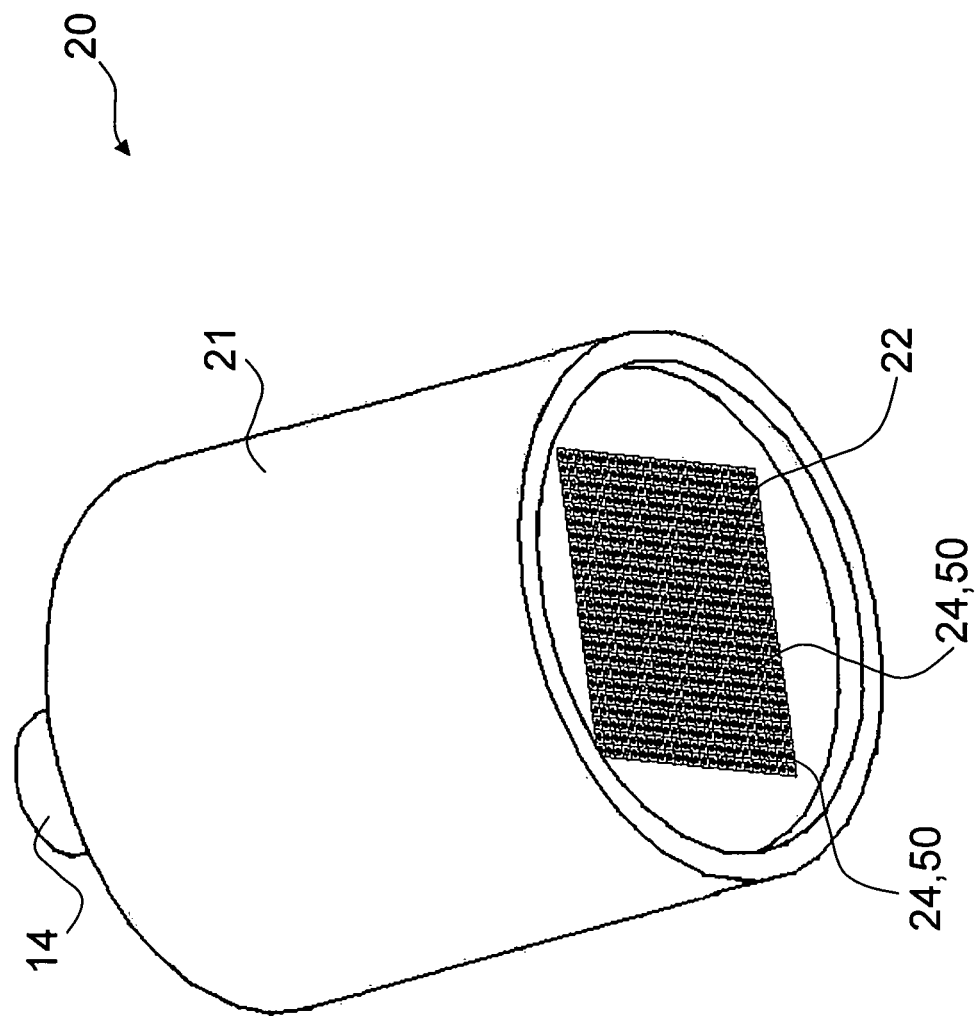
FIG. 2 shows a perspective view of an inventive sensor head.

FIG. 2 shows a general structure of a sensor head 20. The sensor head 20 comprises a housing 21, which in the shown embodiment has a cylindrical outer shape. At a first front face of the cylindrical sensor head 20 a plurality of receiving spaces 24 is arranged in a regular rectangular pattern. The receiving spaces 24 are populated with individual sensor devices 50, which may in particular be photodiodes or fibre ends coupled to photodiodes.

The rectangular pattern of receiving spaces 24 and sensor devices 50, respectively, forms a two-dimensional array 22, in particular with a rectangular outer shape. In the two-dimensional array 22 the receiving spaces 24 and sensor devices 50, respectively, are arranged in rows 30 and columns 32 extending perpendicularly to each other.

Figure 3:
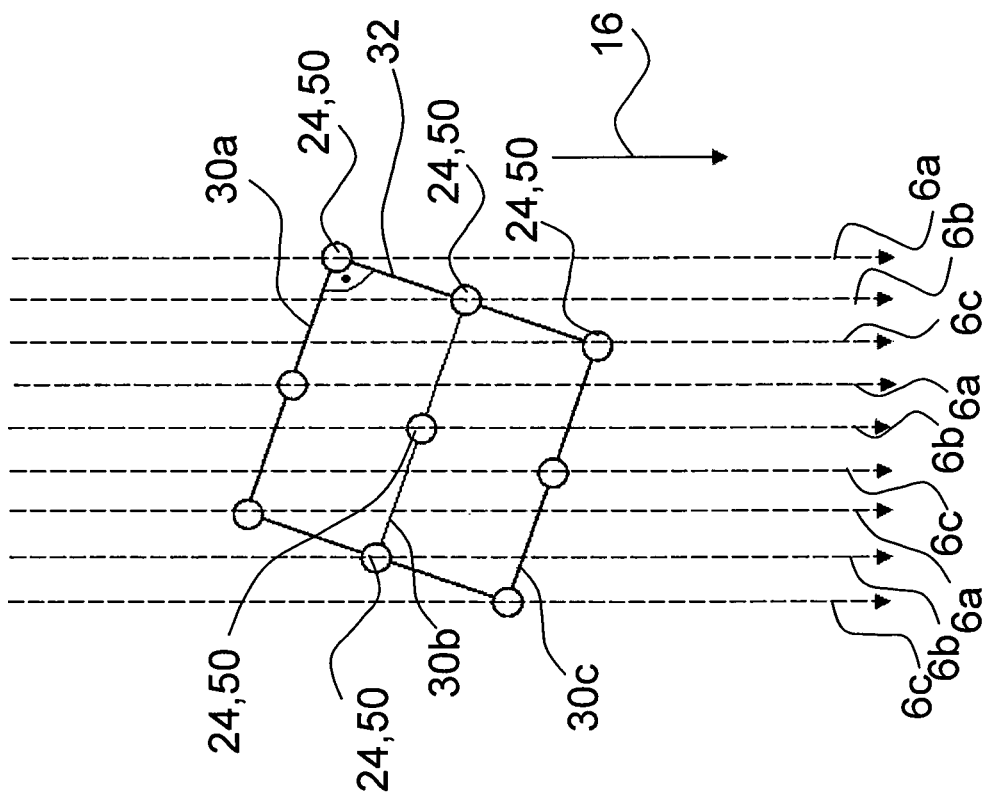
FIG. 3 shows the general principle of the inventive sensor apparatus and method.

The general principle of a detecting or scanning operation is shown in FIG. 3. The sensor head 20 is arranged in a tilted or inclined position with regard to an advance direction 16 of an object 8 to be scanned. In particular, in the tilted or inclined position of the sensor head 20 the receiving spaces 24 of different rows 30 are offset with regard to the advance direction 16. The receiving spaces 24 are equipped with individual sensor devices 50.

The sensor devices 50 of a first row 30a are arranged to scan the object 8 along first individual lines 6a parallel to the advance direction 16 when the object is moved in the advance direction 16. The first lines 6a are spaced from one another in a direction perpendicular to the advance direction 16. A second row 30b is offset with regard to the first row 30a such that the sensor devices 50 of the second row 30b are arranged to scan the object 8 along second individual lines 6b spaced from one another and spaced from the first individual lines 6a in a direction perpendicular to the advance direction 16. The sensor devices 50 of a last row 30c are arranged to scan the object 8 along individual lines 6c spaced from one another and spaced from all preceding lines 6a, 6b in a direction perpendicular to the advance direction 16.

Figure 4:
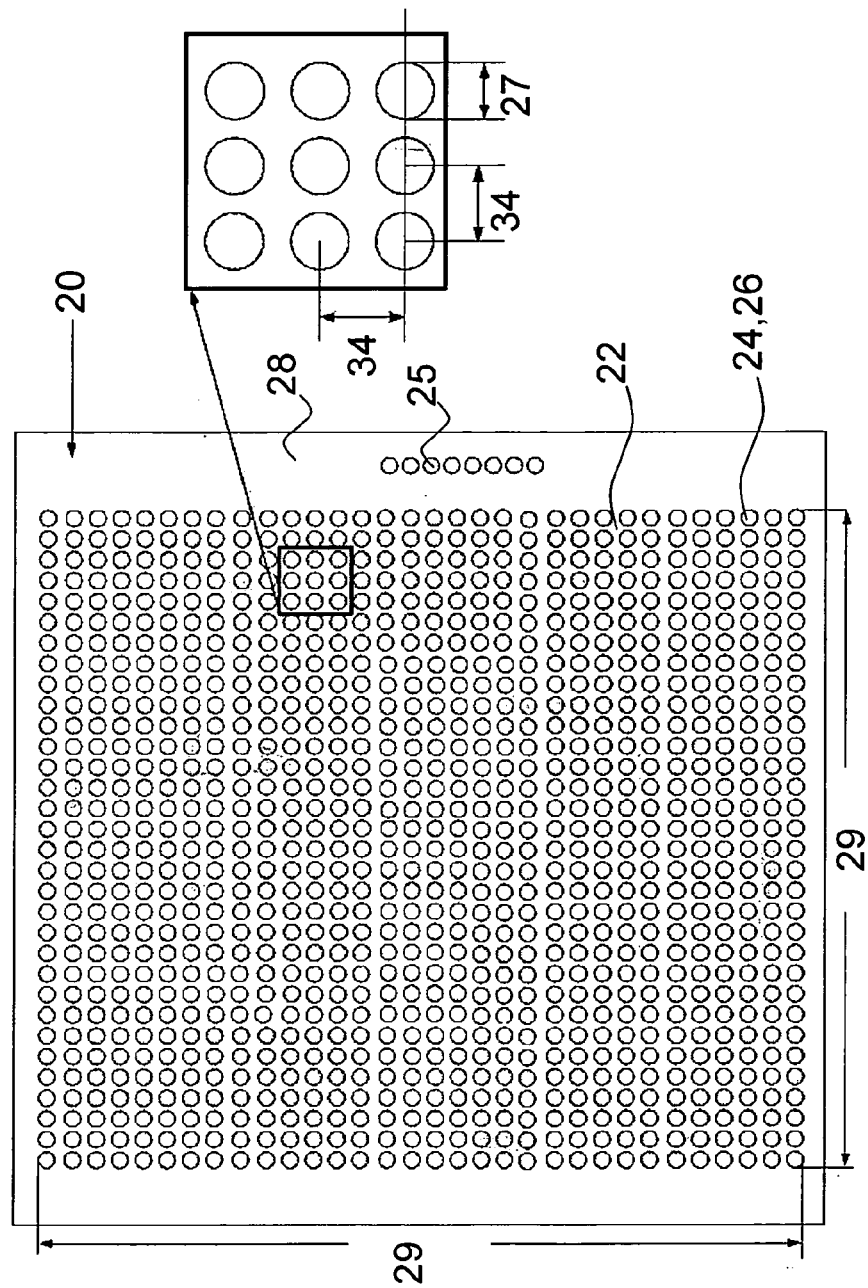
FIG. 4 shows an array of receiving spaces for sensor devices.

An array 22 of receiving spaces 24 of a sensor head 20 is shown in FIG. 4. The receiving spaces 24 are formed in a receiving plate 28, which may be a metal plate, for example a steel plate, for example with a thickness of approximately 5 mm. The receiving spaces 24 are formed as circular receiving holes 26 in the receiving plate 28, in particular through-holes with a circular cross-section.

In a preferred embodiment the array 22 of receiving spaces 24 has a device pitch 34 in the row direction and in the column direction of about 1 to 4 mm, the device pitch 34 being defined as the distance between the central points of two adjacent receiving spaces 24 in one row 30 or column 32, respectively. It is preferred that each of the receiving holes 26 has a diameter 27 of 1 to 3 mm.

In the shown embodiment, the receiving plate 28 comprises an array 22 of receiving spaces 24 arranged in a regular square pattern. The shown array 22 comprises 32 times 32 receiving spaces 24 with a device pitch 34 of 3.2 mm and a diameter 27 of the receiving spaces 24 of 2.0 mm, resulting in a width 29 of the array 22 in the row and column direction of 102.4 mm.

In addition to the array 22 of receiving spaces 24, a plurality of spare receiving spaces 25 is provided for accommodating spare sensor devices 51. The spare receiving spaces 25 are also formed as receiving holes in the receiving plate 28.

Figure 5:
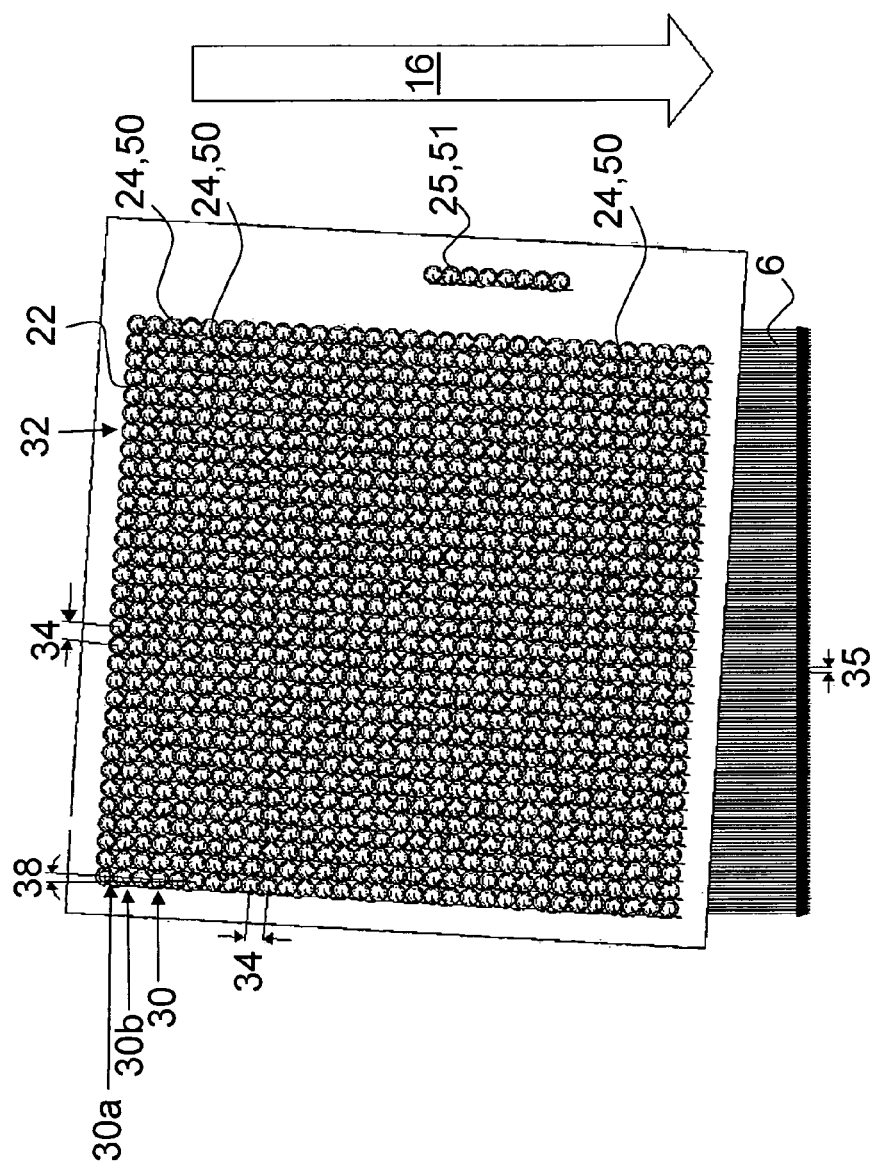
FIG. 5 shows a fully populated and tilted array.

In FIG. 5 a fully populated receiving plate 28 is shown in a tilted position. The tilted position is defined in particular in that the rectangular pattern of rows 30 and columns 32 is tilted from a position in which the columns 32 are aligned with the advance direction 16 to a position in which the columns 32 are slanted or inclined with regard to the advance direction 16.

The tilted or inclined position of the array 22 enhances the maximum possible resolution of the scanning. A first row 30a of sensor devices 50 may scan the object with a resolution in the transverse direction according to the number of sensor devices 50 in the first row 30a. That is, if the first row 30a comprises 32 sensor devices 50, the maximum resolution in the transverse direction is 32 lines or pixels. Due to the tilted position of the array, a second row 30b is staggered with regard to the first row 30a in the transverse direction, so that the sensor devices 50 of the second row 30b may scan lines, which are offset with regard to the lines of the first row 30a. Thus, the resolution of the scanning is doubled, if the first and second rows have the same number of sensor devices 50.

A third row and successive rows 30 are also staggered with regard to any of the preceding rows 30, so that the resolution is further enhanced. The maximum possible resolution is defined by the product of the number of sensor devices 50 per row and the number of sensor devices 50 per column. For example, if the sensor head 20 has 32 times 32 sensor devices 50 arranged in a slanted or inclined array 22, the maximum resolution is 1024 pixels in the transverse direction, in particular a direction perpendicular to the advance direction 16.

With the tilted array 22 of sensor devices 50 a scanning line pitch 35 being a distance between two adjacent scanning lines is smaller than the device pitch 34.

Figure 6:
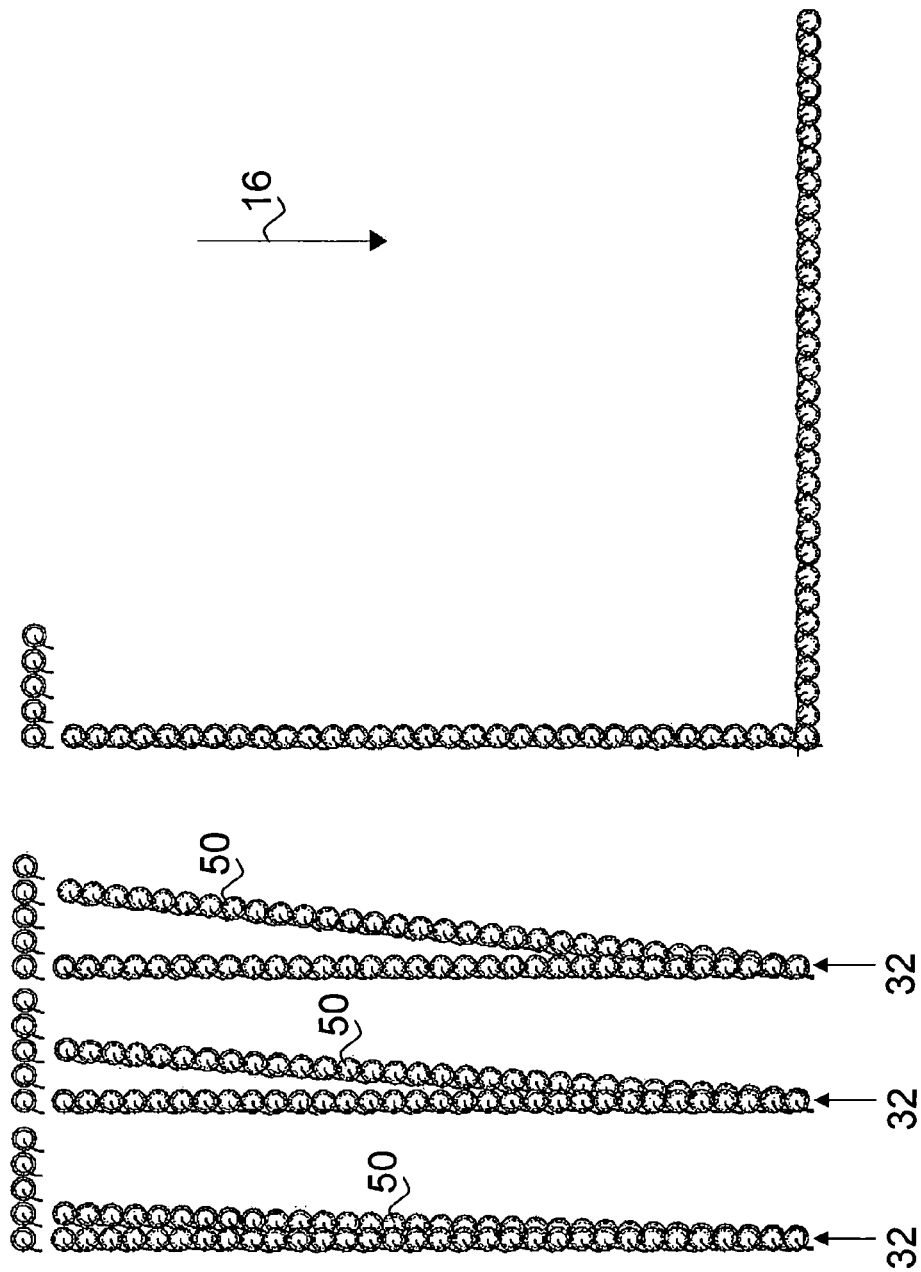
FIG. 6 shows the general principle of a multiple scan option.

FIG. 6 schematically shows different tilting angles 38 (cf. FIG. 5) of a sensor device array 22. In the left representation of FIG. 6 the array 22 is tilted to a degree such that each of the sensor devices 50 of one column 32 is arranged to scan the object 8 along line 6 that is offset with regard to any of the lines being scanned by any of the other sensor devices 50 of the same column 32 when the object 8 is moved along the advance direction 16. That is, the sensor devices 50 of one column 32 are offset with regard to any other sensor devices 50 of the same column 32. With this configuration the maximum resolution of a given sensor head 20 may be achieved.

In the middle representation the array 22 is tilted to a degree in which a double scan of any pixel is possible. That is, the sensor devices 50 of one column 32 correspond to the sensor devices 50 of another column 32 such that one and the same pixel may be scanned by two different sensor devices 50 arranged in different columns 32.

In the right representation the array 22 is tilted to a degree in which a triple scan of any pixel is possible. That is, the sensor devices 50 of one column 32 correspond to the sensor devices 50 of two other columns 32 such that one and the same pixel may be scanned by three different sensor devices 50 arranged in different columns 32.

Figure 7:
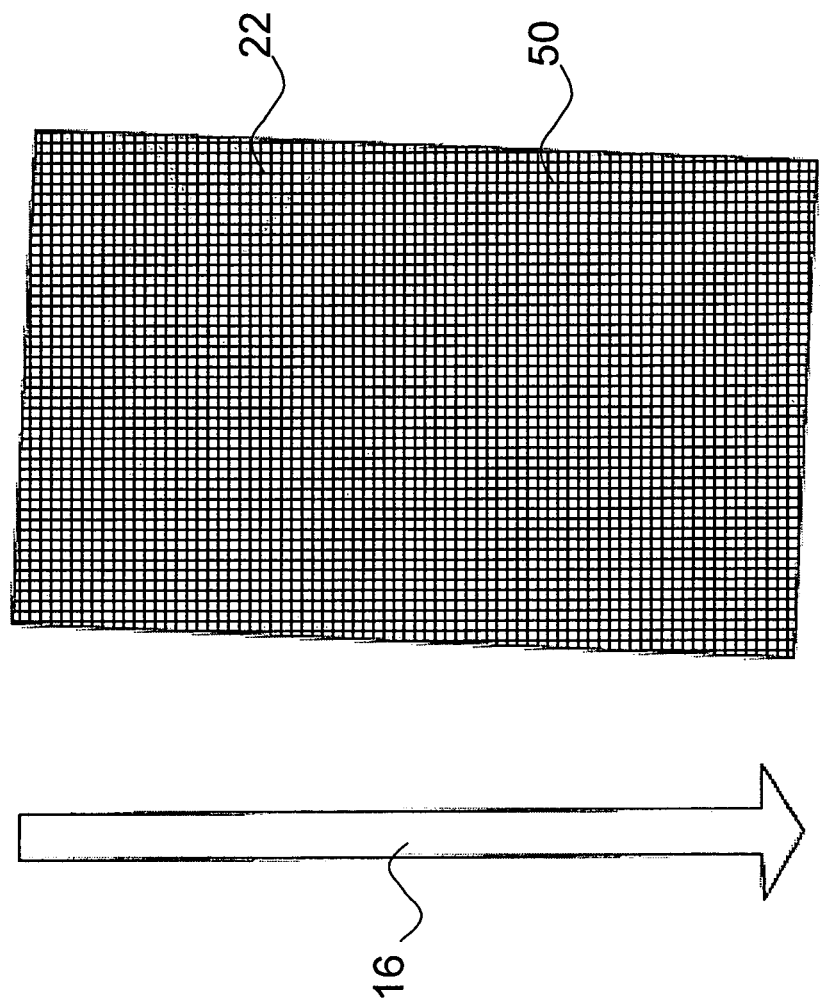
FIG. 7 shows a CCD or CMOS device as sensor devices.

FIG. 7 shows an array 22 of sensor devices 50, wherein the sensor devices 50 are formed in a CCD device or CMOS device. The sides of the array 22 are cut such that a tilted array 22 is achieved, as shown in FIG. 7.

The array 22 of receiving spaces 24 and sensor devices 50, respectively, does not necessarily have to be a two-dimensional array 22. The receiving spaces 24 and sensor devices 50, respectively, can also be arranged in a curved surface. Such three-dimensional structures may for example be used for scanning bottles or similar objects. A closed three-dimensional structure may for example be used for scanning a cylindrical product.

Figure 8:
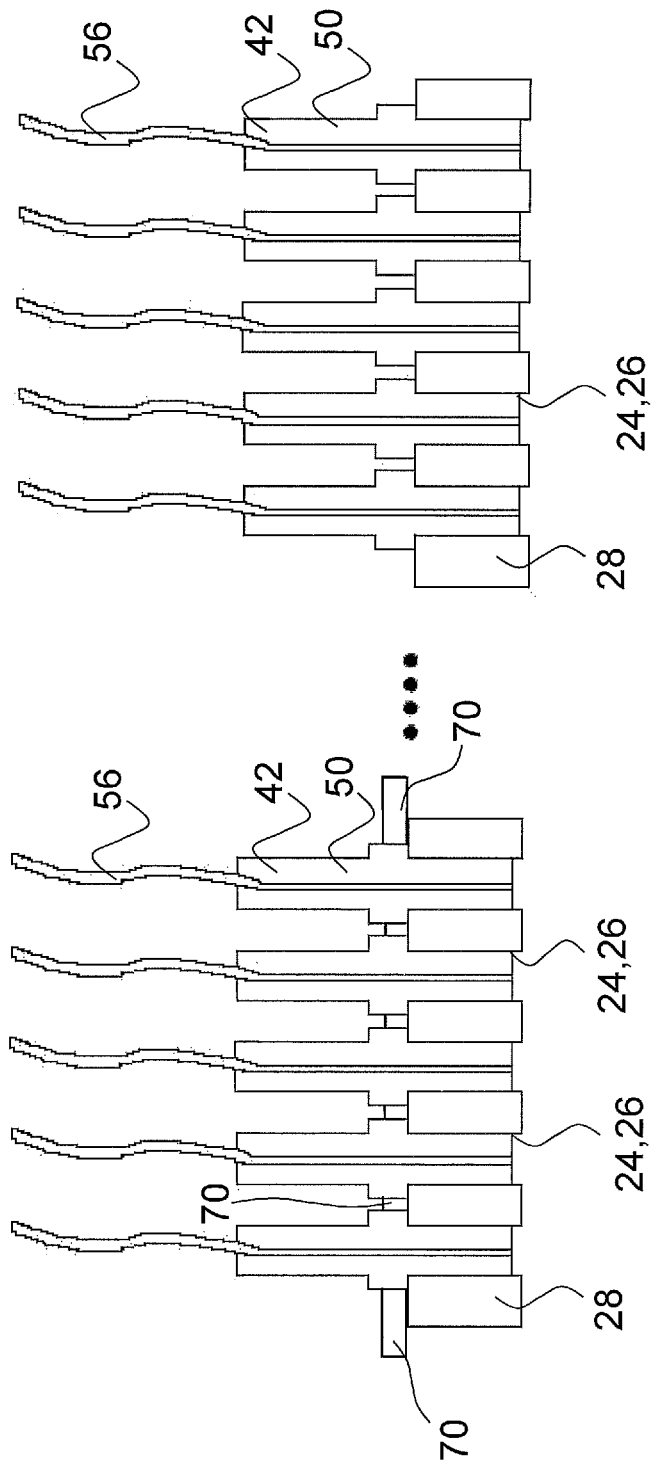
FIG. 8 shows a cross-sectional view of a first embodiment of a sensor device array.

FIG. 8 shows a cross-sectional view of a receiving plate 28 with receiving spaces 24, in which sensor devices 50 are arranged. The receiving spaces 24 are formed as receiving holes 26, in particular through-holes. The sensor devices 50 each comprise a fibre-ferrule 42, in which a fibre end of a fibre 56 is arranged. The ferrules 42 are mounted into the receiving holes 26.

Figure 9:
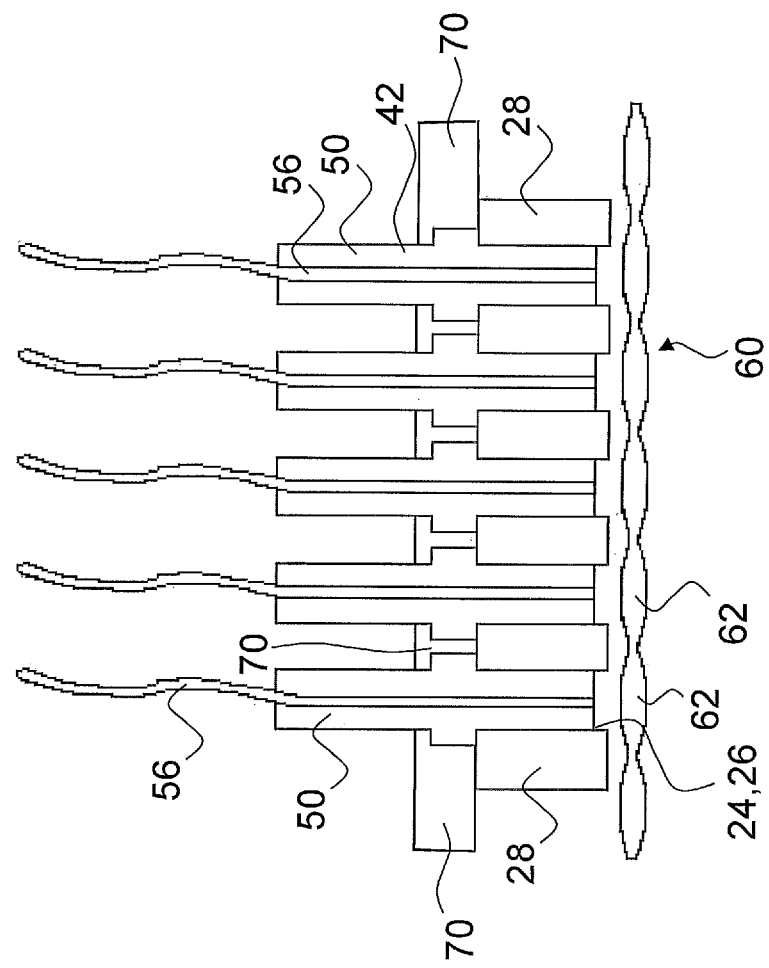
FIG. 9 shows a cross-sectional view of a second embodiment of a sensor device array.

FIGS. 8 and 9 also show a capture pad 70 arranged at at least one surface of the receiving plate 28, for holding the ferrules 42 tight and removable in the receiving holes 24.

FIG. 9 shows a sensor head 20 with a lens array 60. The lens array 60 has the same pitch as the array 22 of receiving spaces 24.

Figure 10:
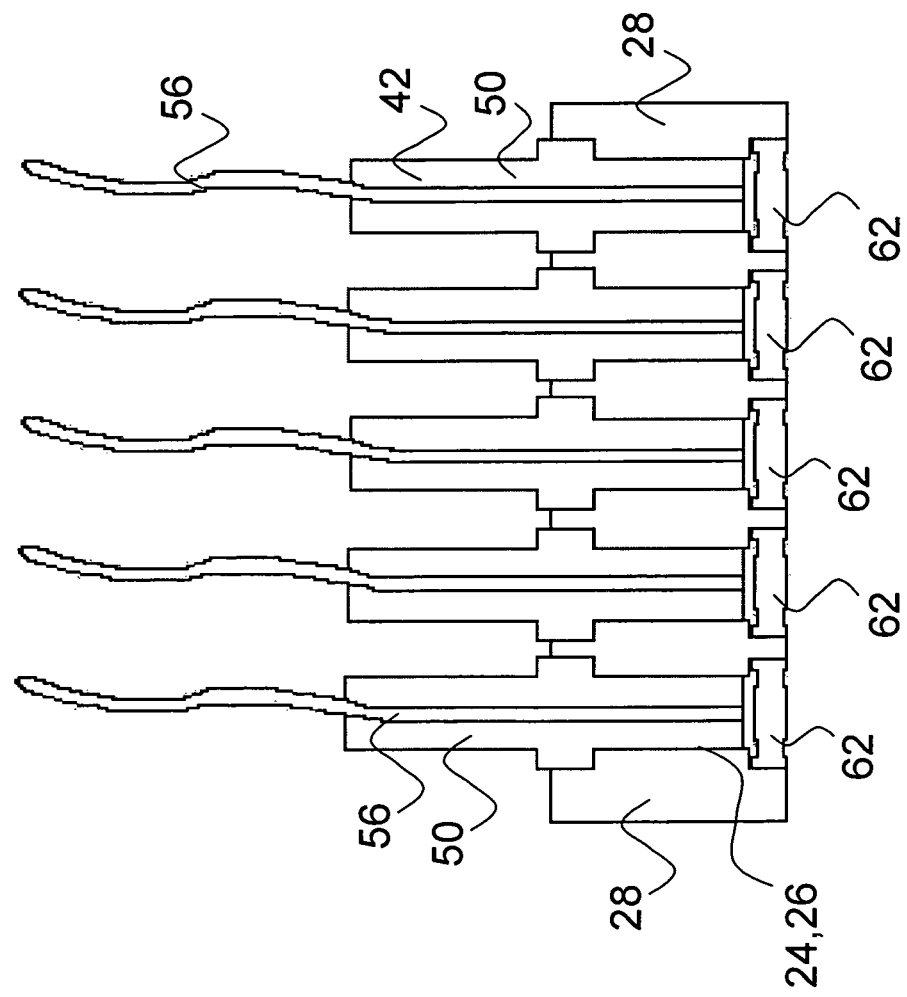
FIG. 10 shows a cross-sectional view of a third embodiment of a sensor device array.

A sensor head 20 with individual lenses or lens inserts 62 inserted into receiving holes 26 of a receiving plate 28 is shown in FIG. 10. With the individual lenses 62, different focal distances for non-planar objects to be scanned are possible. It is also possible to use mixed scanning technologies.

Figure 11:
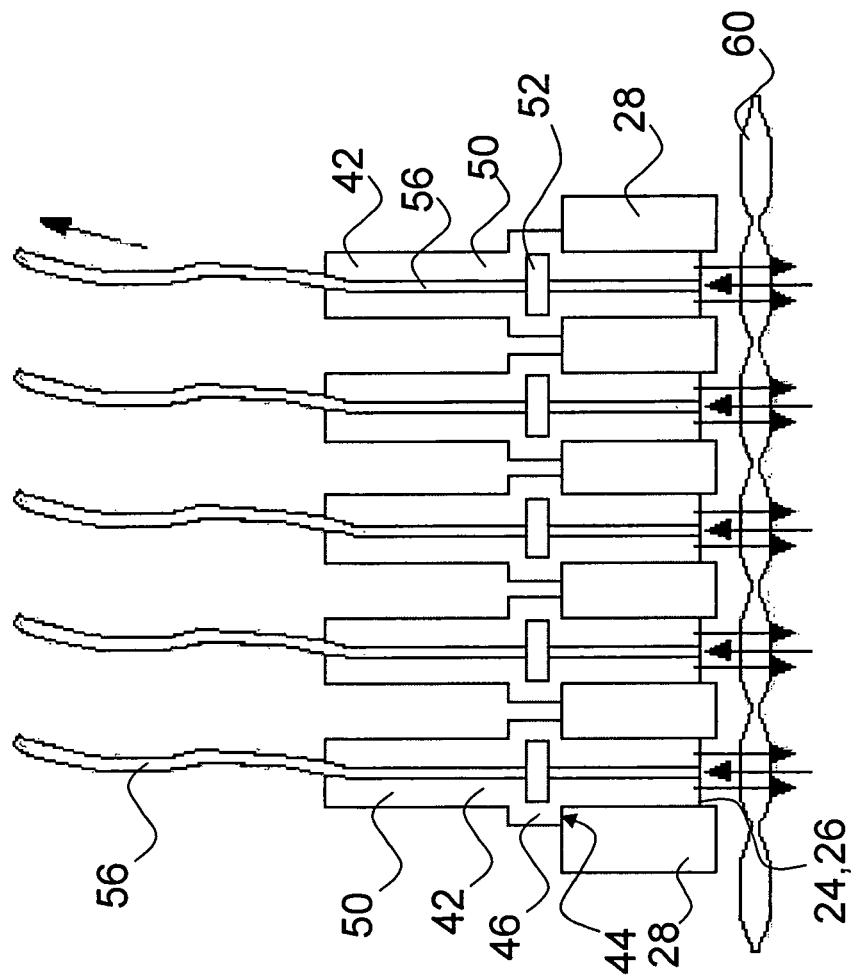
FIG. 11 shows a cross-sectional view of a fourth embodiment of a sensor device array.

FIG. 11 shows a cross-sectional view of a receiving plate 28 having a plurality of receiving holes 26, which are arranged in a two-dimensional matrix. The receiving holes 26 are equipped with individual sensor devices 50, the sensor devices 50 including a ferrule 42 with a channel formed therein. A fibre 56 is coupled to the ferrule 42 such that a fibre end is fixed in the channel of the ferrule 42.

The fibre 56 is connectable to a sensor element for detecting a light signal. The sensor element may for example be a photodiode.

The ferrule 42 includes a lighting element 52 for emitting a light signal onto the object 8. The lighting element 52 is imbedded in a housing of the ferrule 42. The lighting element 52 may have a ring-shape such that the fibre 56 may pass through the lighting element 52 and the lighting element 52 is arranged around the fibre 56. For illuminating the object 8 the ferrule 42 is at least partly transparent.

Figure 12:
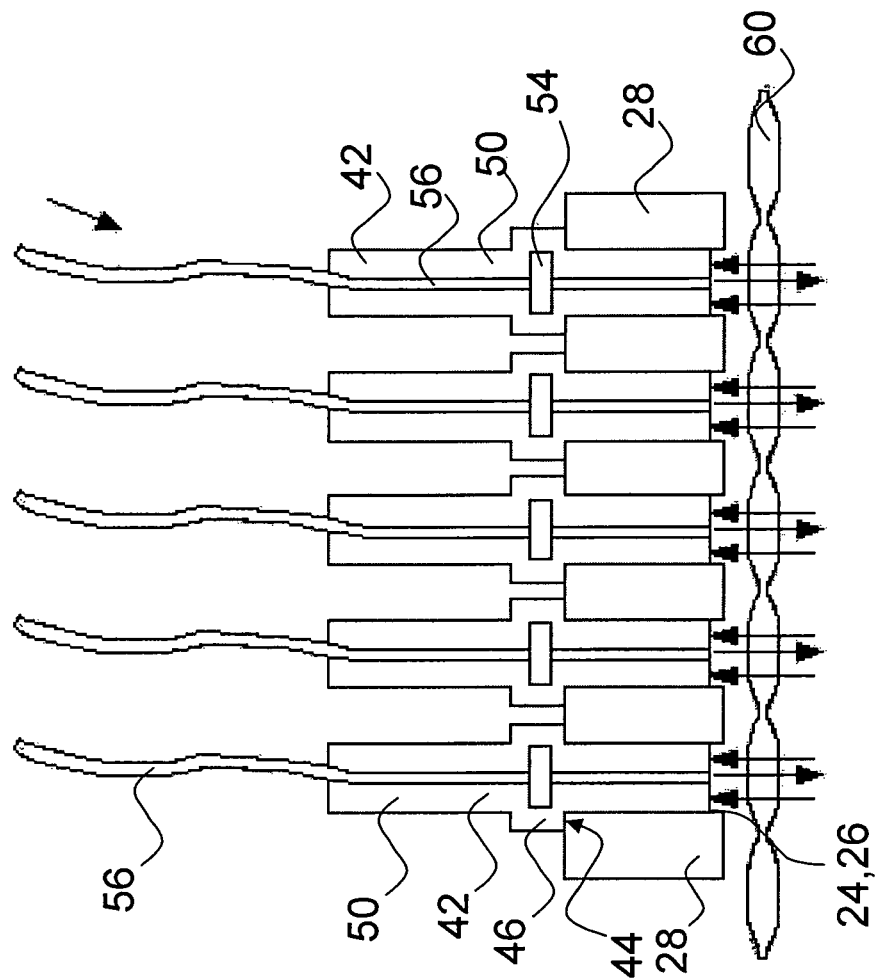
FIG. 12 shows a cross-sectional view of a fifth embodiment of a sensor device array.

FIG. 12 shows a cross-sectional view of a receiving plate 28 with receiving holes 26, wherein the ferrules 42 arranged therein comprise a sensor element 54 such as a photodiode for detecting a light signal of the object 8. The sensor element 54 is imbedded in a housing of the ferrule 42. The sensor element 54 may have a circular shape such that the fibre 56 of the ferrule 42 may pass through the sensor element 54. The object 8 may be illuminate through the fibres 56.

In the cases that a lighting element 52 or a sensor element 54 is arranged in the ferrules 42 it is preferable that a lens 62 is arranged between the ferrule 42 and the object 8. A plurality of lenses 62 may form a lens array 60, as shown in FIGS. 11 and 12.

Figure 13:
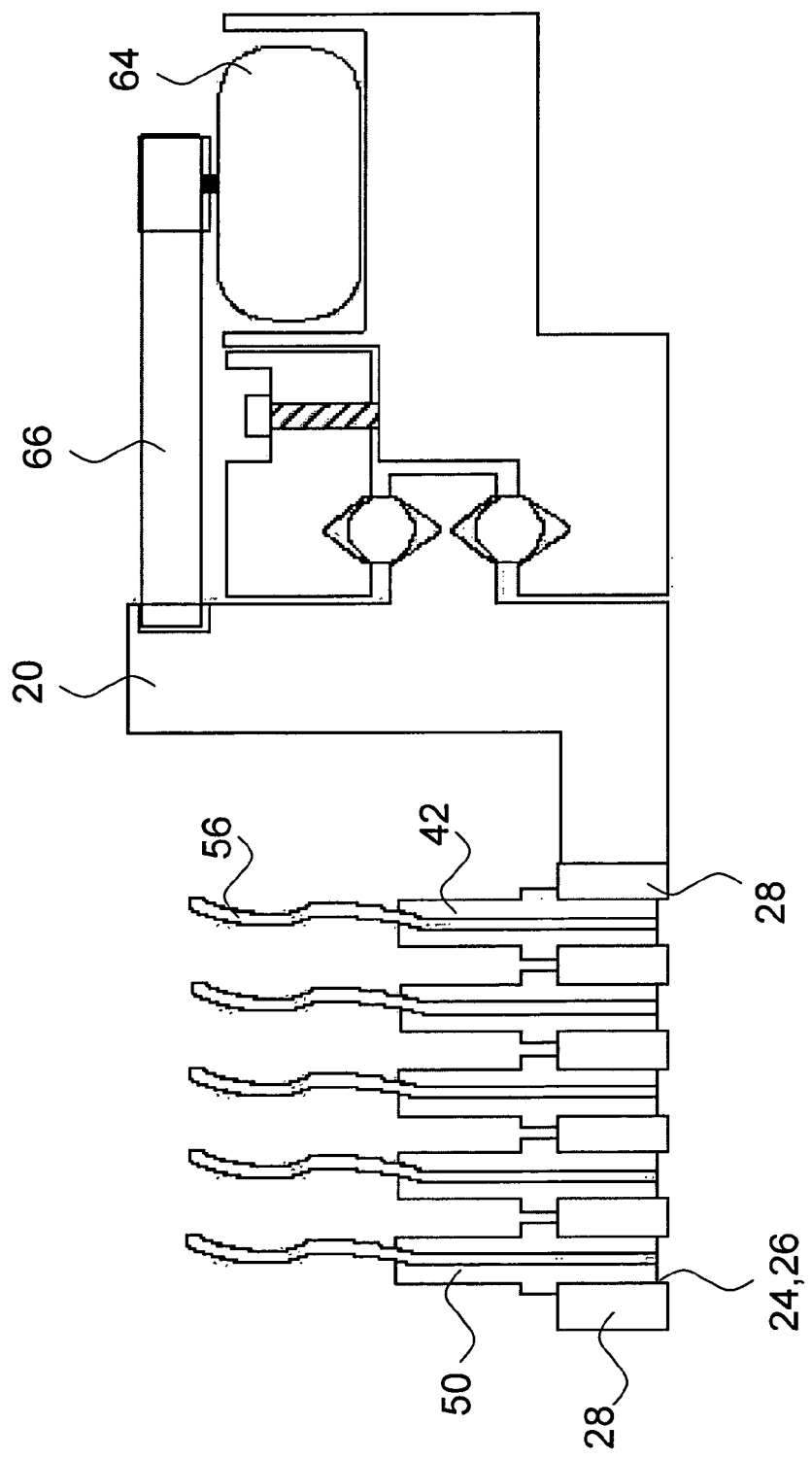
FIG. 13 shows a cross-sectional view of a sensor head with a motor.

A rotatable sensor head 20 is shown in FIG. 13. The sensor head 20 comprises a receiving plate 28 with receiving spaces 24 formed therein. A motor 64, in particular a stepper motor, is arranged for rotating the sensor head 20 and/or the receiving plate 28. A transmission 66, which in the shown embodiment is a belt, is arranged between an output shaft of the motor 64 and the sensor head 20. The sensor head 20 may in particular have a cylindrical outer shape.

Figure 14:
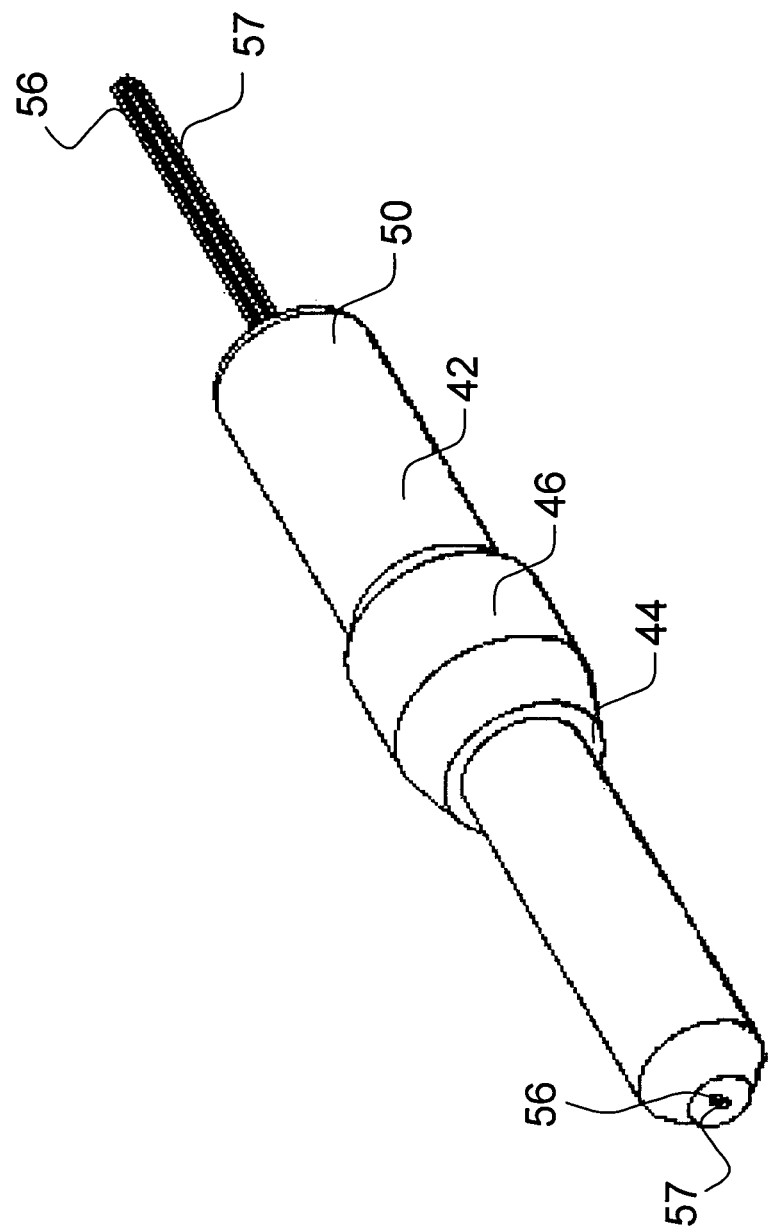
FIG. 14 shows a perspective view of a ferrule with two fibres.

A perspective view of a fibre-ferrule 42 is shown in FIG. 14. The fibre-ferrule 42 includes a substantially cylindrical body or insert made of metal—preferably steal—, ceramic, plastic or glass. It is preferred that the ferrule 42 includes zirconia. The cylindrical body includes a collar 46 with an abutment surface 44 for contacting a planar surface of the receiving plate 28.

The ferrule 42 may have one or more fibres 56 arranged therein. FIG. 14 shows an embodiment with two fibres 56, 57. One of the fibres 56, 57 may be used for illumination, that is, illuminating the object 8 to be detected, and the other fibre may be coupled to a sensor element. The multiple fibre-ferrules 42 can also be used as online pixel monitor. Failed pixels can be recognized during run time. If the fibres 56, 57 of the ferrule 42 are each monitored individually, that is, each fibre is connected to a sensor element, a reliable sensor device 50 can be provided. This sensor device 50 includes a fibre break monitor. There may be no need for a ferrule 42 with a mirror in front.

Figure 15:
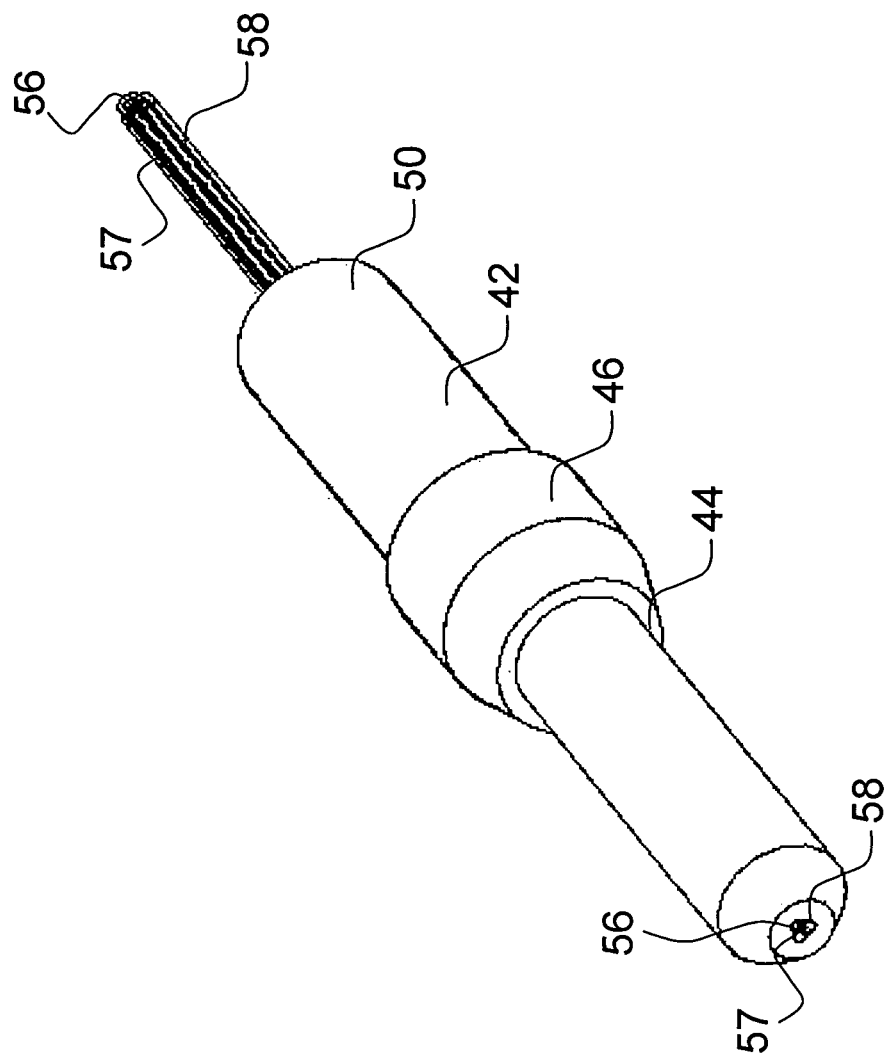
FIG. 15 shows a perspective view of a ferrule with three fibres.

A ferrule 42 with three fibres 56, 57, 58 is shown in FIG. 15. Such a ferrule 42 may for example be used for colour imaging. The three fibres 56, 57, 58 can form an RGB-grouping. Connecting the fibres 56, 57, 58 to sensor elements would allow for colour imaging where the RGB-configuration is used. The sensor elements can be filtered for the appropriate colour.

Generally, the fibre diameters could be increased in size to fill a major portion of the ferrule cross-section to increase signal sensitivity.

The invention claimed is:

1. A sensor apparatus for detecting an object, comprising:
    a sensor head having a plurality of receiving spaces for individual sensor devices and
    a driving mechanism for providing a relative movement of the object relative to the sensor head in an advance direction during a detecting operation,
    wherein the receiving spaces are arranged in a plurality of rows and columns, such that an array of receiving spaces is formed, and wherein the array of receiving spaces is tilted with regard to the advance direction such that the rows extend in a transverse direction relative to the advance direction and the receiving spaces of a successive row of the rectangular pattern are offset with regard to the receiving spaces of a preceding row of the rectangular pattern in a direction perpendicular to the advance direction, wherein the array of the receiving spaces has a rectangular pattern, the sensor head comprises a receiving plate having a plurality of receiving holes formed as through-holes therein, the receiving holes forming the receiving spaces for the individual sensor devices, the sensor devices each include a ferrule which is inserted into a receiving hole of the receiving plate, the receiving holes are formed to tightly and removably hold the individual ferrules therein, and a capture pad is arranged at at least one surface of the receiving plate for holding the sensor devices tight and removable.

2. The sensor apparatus of claim 1, wherein the receiving spaces are arranged in a regular rectangular pattern and the amount of offset of the receiving spaces of a successive row with regard to the receiving spaces of a preceding row is smaller than a pitch of the receiving spaces of one row.

3. The sensor apparatus of claim 1, wherein the rectangular pattern of rows and columns is tilted to a degree in which at least a part of the receiving spaces of at least one row of the rectangular pattern is aligned with at least a part of the receiving spaces of at least one preceding row in the advance direction.

4. The sensor apparatus of claim 1, wherein the sensor head is rotatable about an axis perpendicular to the advance direction such that the amount of offset of the receiving spaces is adjustable.

5. The sensor apparatus of claim 1, wherein a motor is provided for rotating the sensor head.

6. The sensor apparatus of claim 1, wherein the receiving spaces are configured to be partially equipped with sensor devices.

7. The sensor apparatus of claim 1, wherein at least a part of the receiving spaces is equipped with sensor devices, wherein the sensor devices comprise at least one of:
an optical sensor element, a capacity sensor element, an inductive sensor element and a chemical sensor element.

8. The sensor apparatus of claim 1, wherein at least a part of the receiving spaces is equipped with optical sensor devices, wherein the optical sensor devices comprise a fibre, which is arranged in a ferrule.

9. The sensor apparatus of claim 8, wherein a lighting element is arranged within the ferrule.

10. The sensor apparatus of claim 8, wherein a sensor element is arranged within the ferrule.

11. The sensor apparatus of claim 8, wherein the ferrule is at least partly transparent.

12. The sensor apparatus of claim 1, wherein at least a part of the receiving holes has a circular cross-section.

13. The sensor apparatus of claim 1, wherein the ferrules fit into the receiving holes in medium or transition fit.

14. Method for detecting an object, with the sensor apparatus of claim 1, wherein the object is detected by a plurality of individual sensor devices, the object is moved relative to the sensor devices in an advance direction during a detecting operation, the sensor devices are arranged in a plurality of rows and columns, such that an array of sensor devices with a rectangular pattern of the sensor devices is formed, and the object is detected while the array of sensor devices is tilted with regard to the advance direction such that the rows extend in a transverse direction relative to the advance direction and the sensor devices of a successive row of the rectangular pattern are offset with regard to the sensor devices of a preceding row of the rectangular pattern in a direction perpendicular to the advance direction.

15. A sensor apparatus for detecting an object, comprising:

a sensor head having a plurality of receiving spaces for individual sensor devices and a driving mechanism for providing a relative movement of the object relative to the sensor head in an advance direction during a detecting operation, wherein the receiving spaces are arranged in a plurality of rows and columns, such that an array of receiving spaces is formed, and wherein the array of receiving spaces is tilted with regard to the advance direction such that the rows extend in a transverse direction relative to the advance direction and the receiving spaces of a successive row of the rectangular pattern are offset with regard to the receiving spaces of a preceding row of the rectangular pattern in a direction perpendicular to the advance direction, wherein the array of the receiving spaces has a rectangular pattern, the sensor head comprises a receiving plate having a plurality of receiving holes formed as through-holes therein, the receiving holes forming the receiving spaces for the individual sensor devices, the sensor devices each include a ferrule which is inserted into a receiving hole of the receiving plate, a lighting element is arranged within the ferrule, and the receiving holes are formed to tightly and removably hold the individual ferrules therein, wherein either a sensor element is arranged within the ferrule, or the ferrule is at least partly transparent.

* * * * *